Patented Dec. 5, 1950

2,532,387

UNITED STATES PATENT OFFICE 2,532,387

PRODUCTION OF METHYLCHLOROSILANES

Donald L. Bailey, Buffalo, and George H. Wagner, Kenmore, N. Y., assignors to The Linde Air Products Company, a corporation of Ohio No Drawing. Application September 13, 1949, Serial No. 115,546

2 Claims. (Cl. 260—448.2)

The invention is a process for making methylchlorosilanes, particularly $CH_3SiCl_3$ and $$(CH_3)_2SiCl_2$$

Ethyltrichlorosilane can be prepared in several ways, the method described in application Serial No. 702,084, filed October 9, 1946, by George H. Wagner and Corneille O. Strother being especially advantageous. The nature of that method is indicated by the equation $$C_2H_4 + HSiCl_3 \rightarrow C_2H_5SiCl_3$$

We have now found that methylchlorosilanes can be readily produced by hydrogenating ethyltrichlorosilane in the presence of a boron halide catalyst such as $BCl_3$ or $BF_3$.

The hydrogenation can be carried out as a continuous process, but the experimental work on which this description is based was batch-wise procedure. Approximately equimolar proportions of $C_2H_5SiCl_3$ and hydrogen, together with the catalyst, were sealed in a stainless steel reactor, which was then heated. The reactor was cooled, and its contents fractionated.

Reaction did not occur to a measurable degree in the absence of a catalyst. The recommended quantity of the latter, under the conditions cited above, is 2 cc. of $BCl_3$ per mol of $C_2H_5SiCl_3$; but one-half this quantity of catalyst gave nearly as good results, and doubtless still less would be effective, although possibly necessitating prolongation of the heating time.

The lower limit of the favorable temperature range is just above 400° C. Results at 425° C. were much better than at 400° C., but raising the temperature to 450° C. gave little additional improvement.

When the relation of quantity of $C_2H_5SiCl_3$ to volume of reaction space was 1.7 mols per liter, the pressure which developed at 450° C. was 2200 p. s. i., and reaction did not occur. Pressures above 2500 p. s. i. are recommended. When the quantity of $C_2H_5SiCl_3$ per liter of reaction space was double that cited above, the pressure developed was greater than 5000 p. s. i. (the maximum which could be registered on the only available gauges adapted to be connected to the apparatus used) but was estimated to be less than 10,000 p. s. i. We regard this as the optimum pressure range.

A reaction time of two hours gave a considerably more complete reaction than did one hour, and longer times moderately increased the yield of methylchlorosilanes.

In a typical run, 3.3 mols each of $C_2H_5SiCl_3$ and $H_2$ per liter of reaction space were used, with 2 cc. of $BCl_3$ per mol of $C_2H_5SiCl_3$. The temperature was 450° C., the time 14 hours, and the pressure developed was more than 5000 p. s. i. The product recovered was 82% by weight of the $C_2H_5SiCl_3$ taken, and contained

| | Per cent |
|---|---|
| $HSiCl_3 + H_2SiCl_2$ | <2 |
| $CH_3SiCl_3 + (CH_3)_2SiCl_2$[1] | 47 |
| $SiCl_4$ | 21 |
| $C_2H_5SiCl_3$ (unreacted) | 12 |
| $(C_2H_5)HSiCl_2$ | <2 |
| Residue on distillation | 17 |

[1] About 10% of this fraction was $(CH_3)_3SiCl$.

Throughout the experimental work it was observed that the $SiCl_4$ formed increased in rough proportion to the desired methylchlorosilanes. Following this clue, it was found that the yields of methylchlorosilanes could be significantly improved by adding $SiCl_4$ to the reaction mixture.

Bis(trichlorosilyl)ethane is closely related to $C_2H_5SiCl_3$, the latter being in fact the mono(trichlorosilyl)ethane. We have found that the bis compound can be hydrogenated under conditions generally similar to those which have been described, and that the products are likewise similar.

What is claimed is:

1. Process for making methylchlorosilanes which comprises reacting hydrogen with a compound of the type $$R-C_2H_4-SiCl_3$$

where R is hydrogen or trichlorosilyl, said reaction occurring in the presence of a boron halide at a temperature above 400° C. and at a pressure above 2500 p. s. i.

2. Process according to claim 1 where R in the type formula is hydrogen, the temperature is about 450° C., and the pressure is at least 5000 p. s. i.

DONALD L. BAILEY.
GEORGE H. WAGNER.

REFERENCES CITED

The following references are of record in the file of this patent:

UNITED STATES PATENTS

| Number | Name | Date |
|---|---|---|
| 2,406,605 | Hurd | Aug. 27, 1946 |
| 2,458,703 | Hatcher | Jan. 11, 1949 |